United States Patent
Chen et al.

(10) Patent No.: US 10,445,562 B2
(45) Date of Patent: Oct. 15, 2019

(54) AU FEATURE RECOGNITION METHOD AND DEVICE, AND STORAGE MEDIUM

(71) Applicant: Ping An Technology (Shenzhen) Co., Ltd., Shenzhen, Guangdong (CN)

(72) Inventors: Lin Chen, Guangdong (CN); Guohui Zhang, Guangdong (CN)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/337,931

(22) PCT Filed: Sep. 30, 2017

(86) PCT No.: PCT/CN2017/104819
§ 371 (c)(1),
(2) Date: Mar. 29, 2019

(87) PCT Pub. No.: WO2019/033525
PCT Pub. Date: Feb. 21, 2019

(65) Prior Publication Data
US 2019/0228211 A1    Jul. 25, 2019

(30) Foreign Application Priority Data
Aug. 17, 2017    (CN) .......................... 2017 1 0709113

(51) Int. Cl.
*G06K 9/00* (2006.01)

(52) U.S. Cl.
CPC ..... *G06K 9/00288* (2013.01); *G06K 9/00228* (2013.01); *G06K 9/00268* (2013.01)

(58) Field of Classification Search
CPC ........... G06K 9/00288; G06K 9/00228; G06K 9/00268
See application file for complete search history.

(56) References Cited

U.S. PATENT DOCUMENTS

2012/0141018 A1*  6/2012  Shiell ............... G06K 9/621
                                                    382/159
2015/0169938 A1*  6/2015  Yao ................ G06K 9/00261
                                                    382/103
(Continued)

FOREIGN PATENT DOCUMENTS

CN          103366153 A       10/2013

OTHER PUBLICATIONS

International Search Report of PCT Patent Application No. PCT/CN2017/104819 dated May 18, 2018.
(Continued)

*Primary Examiner* — Kim Y Vu
*Assistant Examiner* — Molly Delaney

(57) ABSTRACT

The disclosure discloses an action unit (AU) feature recognition method, which includes: acquiring a real-time image shot by a photographic device and extracting a real-time facial image from the real-time image by use of a face recognition algorithm; inputting the real-time facial image into a pretrained facial mean shape and recognizing t facial feature points from the real-time facial image by use of the facial mean shape; determining feature regions matched with each AU in the real-time facial image according to positions of the t facial feature points, extracting local features from the feature regions and generating multiple feature vectors; and inputting the multiple feature vectors into pretrained AU classifiers matched with the feature regions respectively to obtain a prediction result of recognition of the corresponding AU features from the feature regions. The disclosure also discloses an electronic device and a computer-readable storage medium.

9 Claims, 4 Drawing Sheets

(56) References Cited

U.S. PATENT DOCUMENTS

2015/0286858 A1* 10/2015 Shaburov ............. G06K 9/6209
                                                       382/103
2016/0275342 A1*  9/2016 Silva ................... G06K 9/6209
2017/0262695 A1*  9/2017 Ahmed .............. G06K 9/00288

OTHER PUBLICATIONS

2nd Office Action of counterpart Chinese Patent Application No. 201710709113.2 dated Jul. 31, 2018.
Notification to Grant Patent Right of counterpart Chinese Patent Application No. 201710709113.2 dated Aug. 23, 2018.
Kazemi, Vahid et al., One Millisecond Face Alignment with an Ensemble of Regression Trees, CVPR2014., Jun. 27, 2014, p. 2, Section 2.1.

* cited by examiner

AU FEATURE RECOGNITION METHOD AND DEVICE, AND STORAGE MEDIUM

CLAIM OF PRIORITY

This application is based on the Paris Convention and claims priority to China Patent Application No. CN201710709113.2, filed on Aug. 17, 2017 and entitled "AU Feature Recognition Method and Device, and Storage Medium", which is hereby incorporated by reference in its entirety.

TECHNICAL FIELD

The disclosure relates generally to the technical field of computer vision processing, and more particularly relates to an action unit (AU) feature recognition method and device, and a computer-readable storage medium.

BACKGROUND

Facial emotion recognition, an important part of human-computer interaction and affective computing researches, relates to the research fields of psychology, sociology, anthropology, life sciences, cognitive sciences, computer sciences and the like and is significant for intelligent and harmonious human-computer interaction.

The internationally renowned psychologist Paul Ekman and his research partner W. V. Friesen made a thorough research to describe corresponding relationships between different facial muscle actions and different expressions by observation and biofeedback. Facial action coding system (FACS) is a facial action coding system created in 1976 after years of researches. According to an anatomic characteristic of a face, the face may be divided into a plurality of AUs which are mutually independent and also mutually associated and motion features of these AUs and main regions controlled by them may reflect facial expressions.

At present, a method for recognizing an AU feature in a facial image to judge a facial expression is relatively common and relatively high in accuracy. However, AU feature recognition in the industry is mostly implemented by collecting a great number of AU samples, arranging and dividing the samples into several types and training an AU feature recognition model by use of a convolutional neural network for AU feature recognition. This method is not so accurate.

SUMMARY

The disclosure provides an AU feature recognition method and device and a computer-readable storage medium, which mainly aim at recognizing an AU feature in a feature region in a real-time facial image through different AU classifiers and effectively improving AU feature recognition efficiency.

In order to achieve the foregoing objective, the disclosure provides an electronic device, which includes a memory, a processor and a photographic device, an AU feature recognition program being stored in the memory and the AU feature recognition program being executed by the processor to implement the following steps of:

a real-time image capturing step: acquiring a real-time image shot by the photographic device and extracting a real-time facial image from the real-time image by use of a face recognition algorithm;

a facial feature point recognition step: inputting the real-time facial image into a pretrained facial mean shape and recognizing t facial feature points from the real-time facial image by use of the facial mean shape;

a local feature extraction step: determining feature regions matched with each AU in the real-time facial image according to positions of the t facial feature points, extracting local features from the feature regions and generating multiple feature vectors; and an AU feature prediction step: inputting the multiple feature vectors into pretrained AU classifiers matched with the feature regions respectively to obtain a prediction result of recognition of the corresponding AU features from the feature regions.

Preferably, the facial mean shape is obtained by training a facial feature recognition model, and the facial feature recognition model is an ensemble of regression trees (ERT) algorithm and is represented by a formula as follows:

$$\hat{S}^{t+1} = \hat{S}^{t} + \tau_t(I, \hat{S}^t),$$

where t represents a concatenation sequence number, $\tau_t(\cdot, \cdot)$ represents a regressor of a present stage and S (t) is a shape estimate of a present model; each regressor $\tau_t(\cdot, \cdot)$ predicts an increment $\tau_t(I, \hat{S}^t)$ according to an input present image I and S (t) and adds the increment to the present shape estimate to improve the present model; and in a model training process, part of feature points of all sample pictures are extracted to train a first regression tree, a second tree is trained by use of residuals between predicted values of the first regression tree and true values of the part of feature points, and so on, when predicted values of an Nth trained tree and the true values of the part of feature points are close to zero, all regression trees of the ERT algorithm are obtained, and the facial mean shape is obtained according to these regression trees.

Preferably, the AU feature recognition program is executed by the processor to further implement the following step:

a judgment step: judging whether probabilities of each AU feature in the prediction result are higher than a preset threshold value or not.

Preferably, the judgment step further includes:

a prompting step: when it is judged that an AU feature of which the probability is higher than the preset threshold value exists in the prediction result, making such a prompt that the AU feature is recognized from the real-time facial image.

Preferably, training steps for the predetermined AU classifier include:

a sample preparation step: collecting a facial sample image, cropping an image region matched with each AU from the facial sample image as a positive sample image of the AU and preparing a negative sample image for each AU;

a local feature extraction step: extracting local features of the positive sample image and negative sample image of each AU and generating corresponding feature vectors; and a model training step: performing learning training on a support vector machine (SVM) by use of the local feature of the positive/negative sample image of each AU to obtain the corresponding AU classifier.

Preferably, the face recognition algorithm includes a geometric-feature-based method, a local feature analysis method, an eigenface method, an elastic-model-based method and a neural network method.

In addition, in order to achieve the foregoing objective, the disclosure also provides an AU feature recognition method, which includes:

a real-time image capturing step: acquiring a real-time image shot by the photographic device and extracting a real-time facial image from the real-time image by use of a face recognition algorithm;

a facial feature point recognition step: inputting the real-time facial image into a pretrained facial mean shape and recognizing t facial feature points from the real-time facial image by use of the facial mean shape;

a local feature extraction step: determining feature regions matched with each AU in the real-time facial image according to positions of the t facial feature points, extracting local features from the feature regions and generating multiple feature vectors; and an AU feature prediction step: inputting the multiple feature vectors into pretrained AU classifiers matched with the feature regions respectively to obtain a prediction result of recognition of the corresponding AU features from the feature regions.

Preferably, the facial mean shape is obtained by training a facial feature recognition model, and the facial feature recognition model is an ensemble of regression trees (ERT) algorithm and is represented by a formula as follows:

$$\hat{S}^{t+1} = \hat{S}^t + \tau_t(I, \hat{S}^t),$$

where t represents a concatenation sequence number, $\tau_t(\cdot,\cdot)$ represents a regressor of a present stage and S (t) is a shape estimate of a present model; each regressor $\tau_t(\cdot,\cdot)$ predicts an increment $\tau_t(I, \hat{S}^t)$ according to an input present image I and S (t) and adds the increment to the present shape estimate to improve the present model; and in a model training process, part of feature points of all sample pictures are extracted to train a first regression tree, a second tree is trained by use of residuals between predicted values of the first regression tree and true values of the part of feature points, and so on, when predicted values of an Nth trained tree and the true values of the part of feature points are close to zero, all regression trees of the ERT algorithm are obtained, and the facial mean shape is obtained according to these regression trees.

Preferably, the method further includes:

a judgment step: judging whether probabilities of each AU feature in the prediction result are higher than a preset threshold value or not.

Preferably, the judgment step further includes:

a prompting step: when it is judged that an AU feature of which the probability is higher than the preset threshold value exists in the prediction result, making such a prompt that the AU feature is recognized from the real-time facial image.

Preferably, training steps for the predetermined AU classifier include:

a sample preparation step: collecting a facial sample image, cropping an image region matched with each AU from the facial sample image as a positive sample image of the AU and preparing a negative sample image for each AU;

a local feature extraction step: extracting local features of the positive sample image and negative sample image of each AU and generating corresponding feature vectors; and a model training step: performing learning training on an SVM by use of the local feature of the positive/negative sample image of each AU to obtain the corresponding AU classifier.

Preferably, the face recognition algorithm includes a geometric-feature-based method, a local feature analysis method, an eigenface method, an elastic-model-based method and a neural network method.

Moreover, in order to achieve the foregoing objective, the disclosure also provides a computer-readable storage medium, in which an AU feature recognition program is stored, the AU feature recognition program being executed by a processor to implement any step in the foregoing AU feature recognition method.

According to the AU feature recognition method, electronic device and computer-readable storage medium disclosed in the disclosure, the feature regions corresponding to each AU feature are cropped in the real-time facial image and the feature regions corresponding to each AU feature are input into the corresponding AU classifiers to obtain the prediction result of recognition of each AU feature, so that AU feature recognition accuracy is improved.

BRIEF DESCRIPTION OF THE ACCOMPANYING DRAWINGS

Achievement of the objective, functional characteristics and advantages of the disclosure will further be described in combination with embodiments and with reference to the accompanying drawings.

DETAILED DESCRIPTION OF ILLUSTRATED EMBODIMENTS

It is to be understood that the specific embodiments described herein are adopted not to limit the disclosure but only to explain the disclosure.

Figure 1:
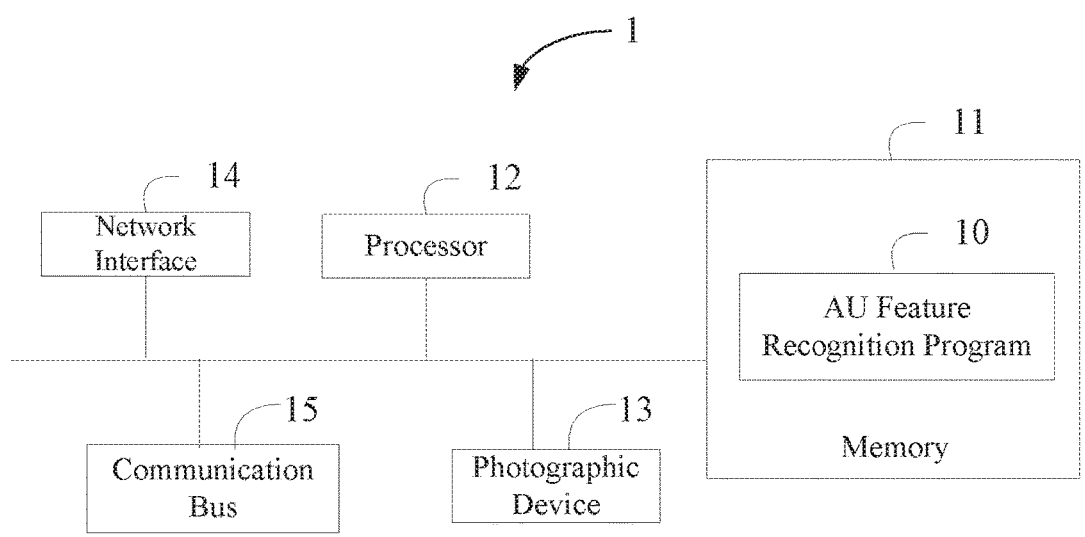
FIG. 1 is a schematic diagram of a preferred embodiment of an electronic device according to the disclosure.

The disclosure provides an electronic device 1. FIG. 1 is a schematic diagram of a preferred embodiment of an electronic device 1 according to the disclosure.

In the embodiment, the electronic device 1 may be terminal equipment with an operation function such as a server, a smart phone, a tablet computer, a portable computer and a desktop computer.

The electronic device 1 includes a processor 12, a memory 11, a photographic device 13, a network interface 14 and a communication bus 15. Herein, the photographic device 13 is mounted at a specific place, for example, an office place and a monitoring region, shoots a target entering the specific place in real time to obtain a real-time image and transmits the shot real-time image to the processor 12 through a network. The network interface 14 may optionally include a standard wired interface and wireless interface (for example, wireless-fidelity (WI-FI) interface). The communication bus 15 is configured to implement connection and communication between these components.

The memory 11 includes at least one type of readable storage medium. The at least one type of readable storage medium may be a nonvolatile storage medium such as a flash memory, a hard disk, a multimedia card and a card type memory 11. In some embodiments, the readable storage medium may be an internal storage unit of the electronic device 1, for example, a hard disk of the electronic device 1. In some other embodiments, the readable storage medium may also be an external memory 11 of the electronic device 1, for example, a plug-in type hard disk, smart media card (SMC), secure digital (SD) card and flash card configured on the electronic device 1.

In the embodiment, the readable storage medium of the memory 11 is usually configured to store an AU feature recognition program 10 installed in the electronic device 1, a facial image sample library, a pretrained facial mean shape and AU classifiers, and the like. The memory 11 may further be configured to temporally store data which has been output or is to be output.

In some embodiments, the processor 12 may be a central processing unit (CPU), a microprocessor or another data processing chip and is configured to run a program code stored in the memory 11 or process data, for example, executing the AU feature recognition program 10.

FIG. 1 only illustrates the electronic device 1 with the components 11-15. However, it is to be understood that not all of the illustrated components are required to be implemented and, instead, more or fewer components may be implemented.

Optionally, the electronic device 1 may further include a user interface. The user interface may include an input unit such as a keyboard, a voice input device such as equipment with a voice recognition function like a microphone and a voice output device such as a sound and an earphone. Optionally, the user interface may also include a standard wired interface and wireless interface.

Optionally, the electronic device 1 may further include a display. The display may also be properly called a display screen or a display unit, and in some embodiments, may be a light-emitting diode (LED) display, a liquid crystal display, a touch liquid crystal display, an organic light-emitting diode (OLED) touch device and the like. The display is configured to display information processed in the electronic device 1 and configured to display a visual user interface.

Optionally, the electronic device 1 further includes a touch sensor. A region provided by the touch sensor for a touch operation of a user is called a touch region. In addition, the touch sensor may be a resistive touch sensor, a capacitive touch sensor and the like. Moreover, the touch sensor not only includes a contact type touch sensor and but also may include a proximity touch sensor and the like. Besides, the touch sensor may be a single sensor and may also be multiple sensors arranged in, for example, an array.

Furthermore, an area of the display of the electronic device 1 and an area of the touch sensor may be the same and may also be different. Optionally, the display and the touch sensor are arranged in a stacking manner to form a touch display screen. The device senses the touch operation triggered by the user on the basis of the touch display screen.

Optionally, the electronic device 1 may further include a Radio Frequency (RF) circuit, a sensor, an audio circuit and the like. No more elaborations will be made herein.

In the device embodiment shown in FIG. 1, the memory 11 used as a computer storage medium may include an operating system and the AU feature recognition program 10. The processor 12 executes the AU feature recognition program 10 stored in the memory 11 to implement the following steps:

a real-time image shot by a photographic device 13 is acquired, a real-time facial image is extracted from the real-time image by use of a face recognition algorithm and feature regions corresponding to each AU feature are cropped from the real-time facial image; the processor 12 calls pretrained AU classifiers from the memory 11 and inputs the feature regions corresponding to each AU feature into the corresponding AU classifiers to obtain a prediction result of recognition of each AU feature from the real-time facial image for subsequent judgment about an emotion in the present facial image.

In another embodiment, the AU feature recognition program 10 may further be divided into one or more modules and the one or more modules are stored in the memory 11 and executed by the processor 12 to implement the disclosure. The modules in the disclosure refer to a series of computer program instruction segments capable of completing specific functions.

Figure 2:
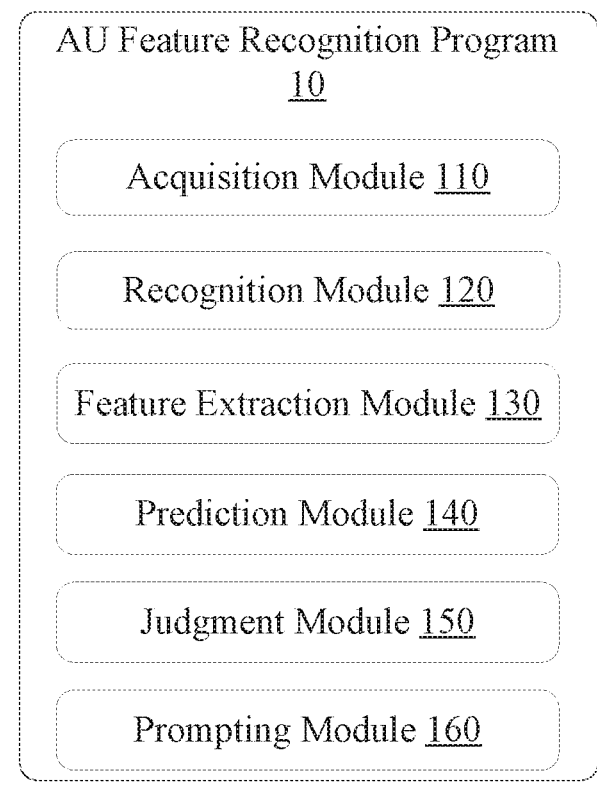
FIG. 2 is a schematic diagram of modules of an AU feature recognition program in FIG. 1

FIG. 2 is a schematic diagram of modules of an AU feature recognition program 10 in FIG. 1.

The AU feature recognition program 10 may be divided into an acquisition module 110, a recognition module 120, a feature extraction module 130, a prediction module 140, a judgment module 150 and a prompting module 160.

The acquisition module 110 is configured to acquire the real-time image shot by the photographic device 13 and extract the real-time facial image from the real-time image by use of the face recognition algorithm. When the photographic device 13 shoots the real-time image, the photographic device 13 sends the real-time image to the processor 12. After the processor 12 receives the real-time image, the acquisition module 110 acquires a picture size at first and constructs a grayscale image with the same size. The acquired color image is converted into the grayscale image and, meanwhile, a memory space is created. A histogram of the grayscale image is equalized to reduce an information amount of the grayscale image and increase a detection speed. Then, a training library is loaded, a face in the image is detected, an object including facial information is returned, data about a position of the face is obtained and an amount of the data is recorded. A portrait region is finally acquired and stored. In such a manner, a real-time facial image extraction process is completed.

Specifically, the face recognition algorithm for extracting the real-time facial image from the real-time image may also be a geometric-feature-based method, a local feature analysis method, an eigenface method, an elastic-model-based method, a neural network method and the like.

The recognition module 120 is configured to input the real-time facial image into a pretrained facial mean shape and recognize t facial feature points from the real-time facial image by use of the facial mean shape. There is made such a hypothesis that t=76 and there are 76 facial feature points in the facial mean shape. After the acquisition module 110 extracts the real-time facial image, the recognition module 120, after calling the pretrained facial mean shape for facial feature points from the memory 11, aligns the real-time facial image and the facial mean shape and then searches the real-time facial image for 76 facial feature points matched with the 76 facial feature points of the facial mean shape by use of a feature extraction algorithm. Herein, the facial mean shape for the facial feature points is constructed and trained in advance. A specific implementation mode will be described in the following AU feature recognition method.

In the embodiment, the feature extraction algorithm is a scale-invariant feature transform (SIFT) algorithm. According to the SIFT algorithm, local features of each facial feature point are extracted from the facial mean shape for the facial feature points, an eye feature point or lip feature point is selected as a reference feature point, and the real-time facial image is searched for a feature point with a local feature the same as or similar to that of the reference feature point, for example, whether a difference value of the local features of the two feature points is within a preset range or not is judged and, if YES, it is indicated that the feature point has a local feature the same as or similar to that of the reference feature point and is determined as a facial feature point. All of the facial feature points are found from the real-time facial image according to this principle. In another embodiment, the feature extraction algorithm may also be a speeded up robust features (SURF) algorithm, a local binary patterns (LBP) algorithm, a histogram of oriented gradients (HOG) algorithm and the like.

The feature extraction module 130 is configured to determine feature regions matched with each AU in the real-time facial image according to positions of the t facial feature points, extract local features from the feature regions and generate multiple feature vectors. In an embodiment, according to an FACS summarized by Paul Ekman, a human being has totally 39 main AUs. Each AU is a small set of muscle contraction codes of a face. For example, AU1 raise the inner corner of the eyebrow, AU2—raise the outer corner of the eyebrow, AU9—wrinkle the nose and AU22—tighten and turn out the lips. Then, for the AU1 and the AU2, it is necessary to determine feature regions matched with the AUs, i.e., the eyebrow, and the feature extraction module 130 determines forehead, eyebrow and eye regions in the real-time facial image as the feature regions matched with the AU1 and the AU2 according to the 76 facial feature points recognized by the recognition module 120 from the real-time facial image, extracts HOG features of the inner corner of the eyebrow and the outer corner of the eyebrow from the forehead, eyebrow and eye regions respectively and forms feature vectors V1 and V2 of the feature regions of the AU1 and the AU2 respectively. Then, for the AU9 and the AU22, it is necessary to determine feature regions matched with the AUs, i.e., the nose and the lips, and the feature extraction module 130 determines nose and lip regions in the real-time facial image as the feature regions matched with the AU9 and the AU22 according to the 76 facial feature points recognized by the recognition module 120 from the real-time facial image, extracts HOG features from the nose and lip regions respectively and forms feature vectors V1 and V2 of the feature regions of the AU9 and the AU22 respectively.

The prediction module 140 is configured to input the multiple feature vectors into pretrained AU classifiers matched with the feature regions respectively to obtain a prediction result of recognition of the corresponding AU features from the feature regions. Herein, there are 39 pretrained AU classifiers corresponding to each AU respectively. The prediction module inputs the feature vectors V1, V2, V9 and V22 into the AU classifiers of the AU1, the AU2, the AU9 and the AU22 respectively and the classifiers output probabilities of recognition of the AU1, the AU2, the AU9 and the AU22 from the corresponding feature regions respectively.

The judgment module 150 is configured to judge whether a probability, higher than a preset threshold value, of recognition of an AU feature from the corresponding feature region exists in the prediction result or not. There is made such a hypothesis that the probabilities of recognition of the AU1, the AU2, the AU9 and the AU22 by each AU classifier from the present real-time facial image are 0.45, 0.51, 0.60 and 0.65 respectively and the preset threshold value is 0.50. The judgment module 150 judges magnitude relationships between the probabilities of recognition of the corresponding AU features from the real-time facial image and the preset threshold value (0.50).

The prompting module 160 is configured to, if the probability, higher than the preset threshold value, of recognition of the AU feature from the corresponding feature region exists in the prediction result, make such a prompt that the AU feature is recognized from the real-time facial image. if the probability of recognition of the AU1 from the present real-time facial image is lower than the preset threshold value and the probabilities of recognition of the AU2, the AU9 and the AU22 from the present real-time facial image are higher than the preset threshold value, the prompting module 160 makes such a prompt that the AU2, the AU9 and the AU22 are recognized from the present real-time facial image.

According to the electronic device 1 disclosed in the embodiment, the feature regions matched with each AU are extracted from the real-time image and the corresponding AU features are recognized from the feature regions respectively, so that AU feature recognition accuracy is improved.

Figure 3:
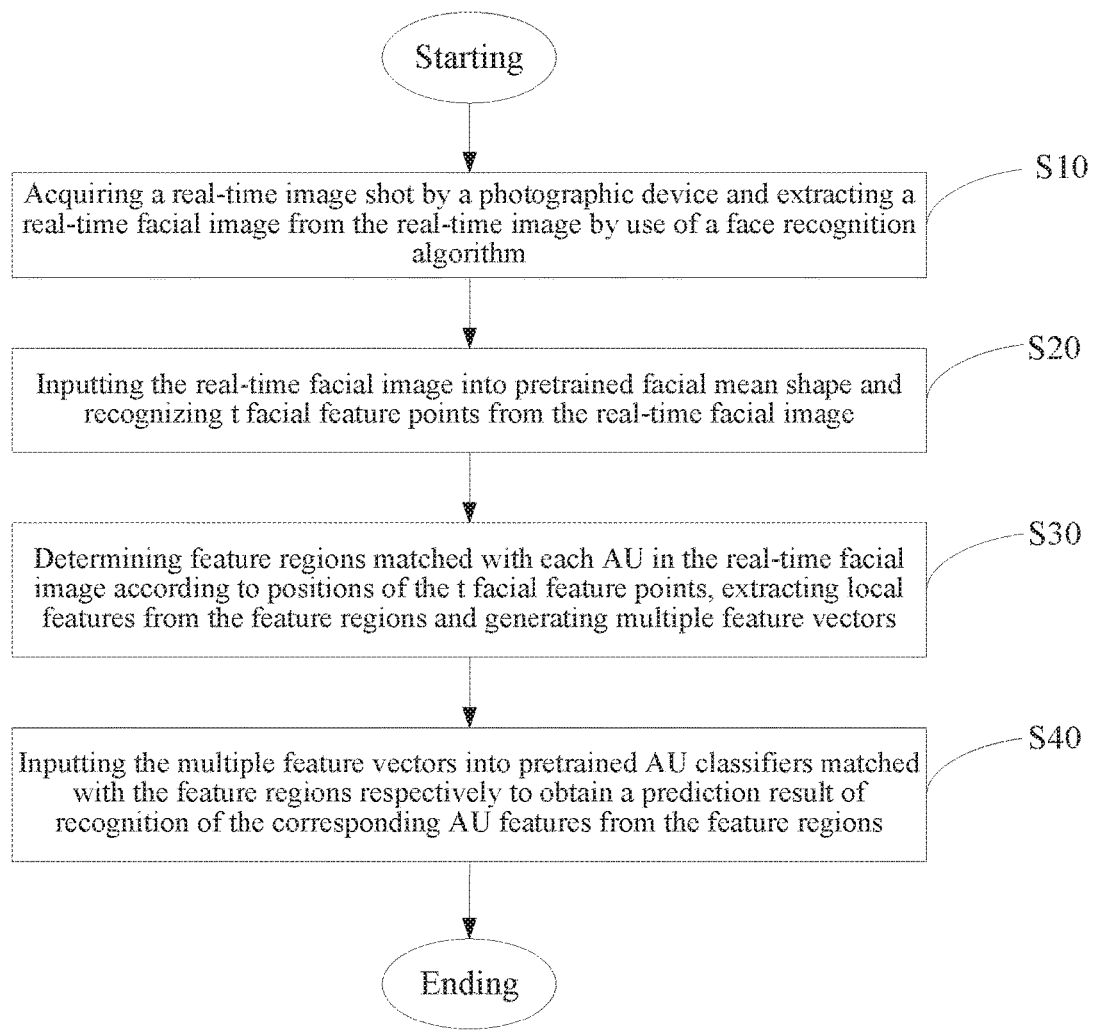
FIG. 3 is a flowchart of a first embodiment of an AU feature recognition method according to the disclosure.

In addition, the disclosure also provides an AU feature recognition method. FIG. 3 is a flowchart of a first embodiment of an AU feature recognition method according to the disclosure. The method may be executed by a device and the device may be implemented by software and/or hardware.

In the embodiment, the AU feature recognition method includes S10-S40.

In S10, a real-time image shot by a photographic device is acquired and a real-time facial image is extracted from the real-time image by use of a face recognition algorithm. When the photographic device 13 shoots the real-time image, the photographic device 13 sends the real-time image to a processor 12. After the processor 12 receives the real-time image, a picture size is acquired at first and a grayscale image with the same size is constructed. The acquired color image is converted into the grayscale image and, meanwhile, a memory space is created. A histogram of the grayscale image is equalized to reduce an information amount of the grayscale image and increase a detection speed. Then, a training library is loaded, a face in the image is detected, an object including facial information is returned, data about a position of the face is obtained and an amount of the data is recorded. A portrait region is finally acquired and stored. In such a manner, a real-time facial image extraction process is completed.

Specifically, the face recognition algorithm for extracting the real-time facial image from the real-time image may also be a geometric-feature-based method, a local feature analysis method, an eigenface method, an elastic-model-based method, a neural network method and the like.

In S20, the real-time facial image is input into a pretrained facial mean shape and t facial feature points are recognized from the real-time facial image by use of the facial mean shape.

Herein, the facial mean shape is obtained by the following method:

A first sample library with n facial images is created and 76 feature points are manually marked at positions of eyes, eyebrows, noses, mouths and facial outer contours in each facial image. The 76 feature points in each facial image form a shape feature vector S and n shape feature points S of a face are obtained.

A facial feature recognition model is trained by use of the t facial feature points to obtain a facial mean shape. The facial feature recognition model is an ERT algorithm. The ERT algorithm is represented by a formula as follows:

$$\hat{S}^{t+1} = \hat{S}^t + \tau_t(I, \hat{S}^t),$$

where t represents a concatenation sequence number and $\tau_t(\cdot)$ represents a regressor of a present stage. Each regressor consists of multiple regression trees and an objective of training is to obtain these regression trees. S (t) is a shape estimate of the present model. Each regressor $\tau_t(\cdot,\cdot)$ predicts an increment $\tau_t(I,\hat{S}^t)$ according to an input image I and S (t) and adds the increment to the present shape estimate to improve the present model. The regressors of each stage perform prediction according to the feature points. A training dataset is (I1, S1), . . . , (In, Sn), where I is the input sample image and S is a shape feature vector consisting of feature points in the sample image.

In a model training process, the number of facial images in a first sample library is n. There is made such a hypothesis that each sample picture has 76 feature points and the feature vector is $S=(x_1^i, x_2^i, x_3^i, x_4^i, \ldots, x_{76}^i)$, i=1,2,3 . . . 76. Part of feature points of all the sample pictures (for example, 50 feature points are randomly selected from the 76 feature points of each sample picture) are extracted to train a first regression tree, a second tree is trained by use of residuals between predicted values of the first regression tree and true values (weighted means of the 50 feature points extracted from each sample picture) of the part of feature points, and so on, when predicted values of an Nth trained tree and the true values of the part of feature points are close to zero, all regression trees of the ERT algorithm are obtained, the facial mean shape is obtained according to these regression trees and a shape file and the sample library are stored in a memory.

After the real-time facial image is extracted, first, the pretrained facial mean shape for facial feature points is called from the memory, next, the real-time facial image is aligned with the facial mean shape and then the real-time facial image is searched for 76 facial feature points matched with the 76 facial feature points of the facial mean shape by use of a feature extraction algorithm.

The feature extraction algorithm may be a SIFT algorithm, an SURF algorithm, an LBP algorithm, a HOG algorithm and the like.

In S30, feature regions matched with each AU in the real-time facial image are determined according to positions of the t facial feature points, local features are extracted from the feature regions and multiple feature vectors are generated.

For example, AU1—raise the inner corner of the eyebrow, AU12—raise the outer corner of the eyebrow, AU9—wrinkle the nose and AU22—tighten and turn out the lips. Then, for the AU1 and the AU2, it is necessary to determine feature regions matched with the AUs, i.e., the eyebrow, forehead, eyebrow and eye regions in the real-time facial image are determined as the feature regions matched with the AU1 and the AU2 according to the 76 facial feature points recognized from the real-time facial image, HOG features of the inner corner of the eyebrow and the outer corner of the eyebrow are extracted from the forehead, eyebrow and eye regions respectively and feature vectors V1 and V2 of the feature regions of the AU1 and the AU2 are formed respectively. Then, for the AU9 and the AU22, it is necessary to determine feature regions matched with the AUs, i.e., the nose and the lips, nose and lip regions in the real-time facial image are determined as the feature regions matched with the AU9 and the AU22 according to the 76 facial feature points recognized from the real-time facial image, HOG features are extracted from the nose and lip regions respectively and feature vectors V9 and V22 of the feature regions of the AU9 and the AU22 are formed respectively.

In S40, the multiple feature vectors are input into pretrained AU classifiers matched with the feature regions respectively to obtain a prediction result of recognition of the corresponding AU features from the feature regions.

Herein, there are 39 pretrained AU classifiers corresponding to the AU1, the AU2, an AU3, . . . , an AU39 respectively and obtained in the following manner.

In the first sample library, an image region matched with each AU (a facial image including the AU) is cropped from each facial sample image as a positive sample image of the AU and a negative sample image is prepared for each AU, so as to obtain the positive sample image and negative sample image of each AU. Different AUs may correspond to the same image region. For example, the AU1, the AU2 and an AU4 all involve regions including the eyebrows, the eyes and the forehead in the facial image and the AU9 and the AU22 involve the nose and lip regions in the facial image. A region not including the AU in the image may be determined as the negative sample image of the AU. The positive sample image and negative sample image of the AU are normalized into the same size. Local features such as HOG features are extracted from the positive sample image and negative sample image of each AU and are stored as feature vectors. The learning training for an SVM is performed by use of the local feature of the positive/negative sample image of each AU to obtain each AU classifier.

The feature vectors V1, V2, V9 and V22 are input into the AU classifiers of the AU1, the AU2, the AU9 and the AU22 respectively and the classifiers output probabilities of recognition of the AU1, the AU2, the AU9 and the AU22 from the corresponding feature regions respectively.

According to the AU feature recognition method disclosed in the embodiment, the feature regions matched with each AU are cropped from the real-time image, the probabilities of recognition of the AU features from the feature regions are judged through the corresponding AU classifiers and the AU features in the feature regions in the real-time facial image are recognized through different AU classifiers, so that AU feature recognition efficiency is effectively improved.

Figure 4:
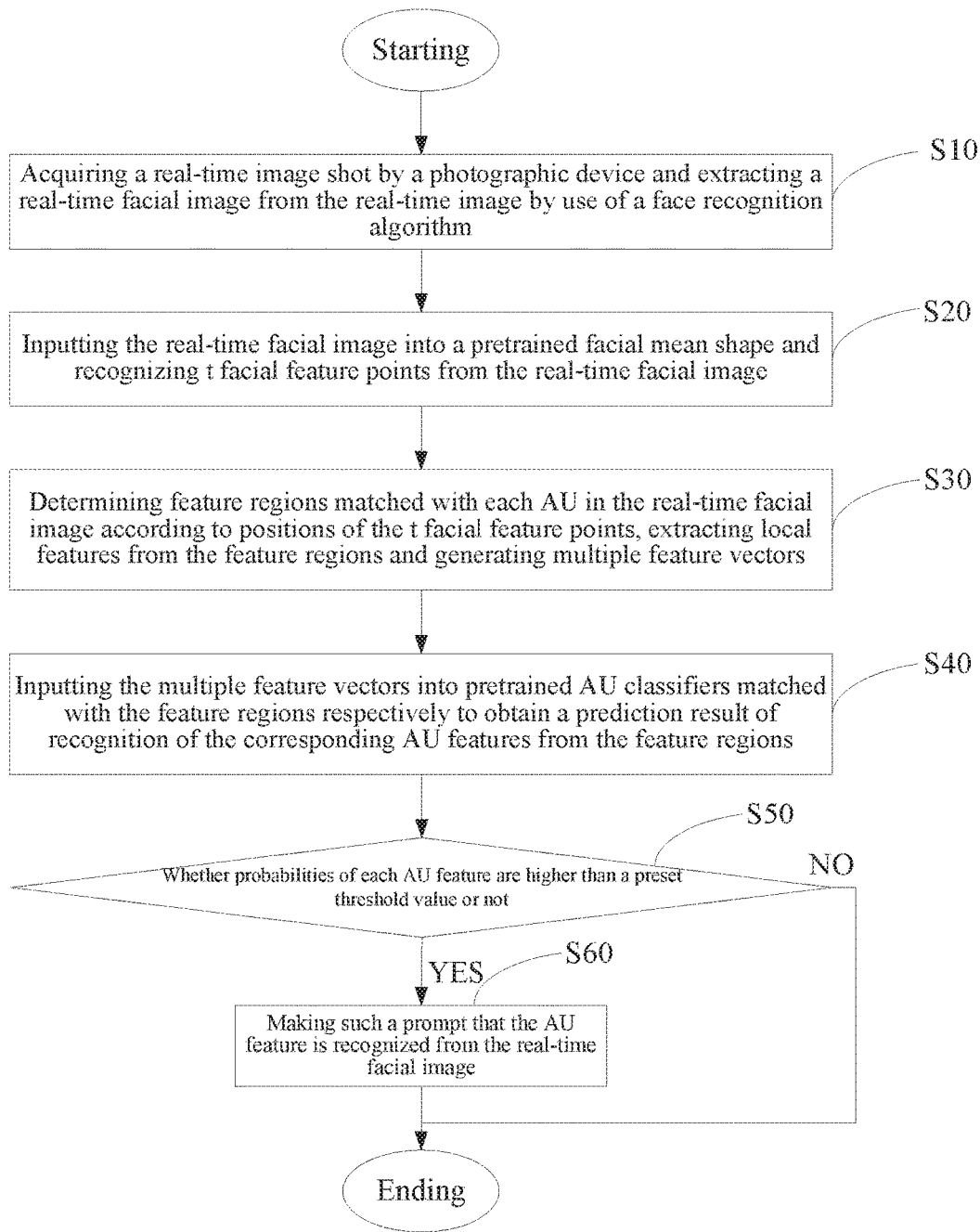
FIG. 4 is a flowchart of a second embodiment of an AU feature recognition method according to the disclosure.

A second embodiment of an AU feature recognition method is disclosed on the basis of the first embodiment. FIG. 4 is a flowchart of a first embodiment of an AU feature recognition method according to the disclosure. The method may be executed by a device and the device may be implemented by software and/or hardware.

In the embodiment, the AU feature recognition method includes S10-S70. Herein, S10-S40 are substantially the same as contents in the first embodiment and will not be elaborated herein.

In S50, whether probabilities of each AU feature in the prediction result are higher than a preset threshold value or not is judged.

There is made such a hypothesis that the probabilities of recognition of the AU1, the AU2, the AU9 and the AU22 by each AU classifier from the present real-time facial image are 0.45, 0.51, 0.60 and 0.65 respectively and the preset threshold value is 0.50. Magnitude relationships between the probabilities of recognition of each AU feature and the preset threshold value (0.50) are judged.

In S60, when it is judged that an AU feature of which the probability is higher than the preset threshold value exists in the prediction result, such a prompt that the AU feature is recognized from the real-time facial image is made. If the probability of recognition of the AU1 from the present real-time facial image is lower than the preset threshold value and the probabilities of recognition of the AU2, the AU9 and the AU22 from the present real-time facial image are higher than the preset threshold value, it is judged that the AU2, the AU9 and the AU22 are recognized from the present real-time facial image and the AU1 is not recognized from the present real-time facial image.

Compared with the first embodiment, the AU feature recognition method disclosed in the embodiment has the advantage that the feature regions matched with each AU is cropped from the real-time image, the probabilities of recognition of the AU features from the feature regions are judged through the corresponding AU classifiers, the AU features in the feature regions in the real-time facial images are recognized through different AU classifiers, the threshold value is set and the probabilities of recognition of the corresponding AUs by each AU classifier are filtered, so that AU feature recognition accuracy is effectively improved.

In addition, an embodiment of the disclosure also discloses a computer-readable storage medium, which includes an AU feature recognition program, the AU feature recognition program being executed by a processor to implement the following operations:

a real-time image capturing step: a real-time image shot by the photographic device is acquired and a real-time facial image is extracted from the real-time image by use of a face recognition algorithm;

a facial feature point recognition step: the real-time facial image is input into a pretrained facial mean shape and t facial feature points are recognized from the real-time facial image by use of the facial mean shape;

a local feature extraction step: feature regions matched with each AU in the real-time facial image are determined according to positions of the t facial feature points, local features are extracted from the feature regions and multiple feature vectors are generated; and an AU feature prediction step: the multiple feature vectors are input into pretrained AU classifiers matched with the feature regions respectively to obtain a prediction result of recognition of the corresponding AU features from the feature regions.

Optionally, the AU feature recognition program is executed by the processor to further implement the following step:

a judgment step: whether probabilities of each AU feature in the prediction result are higher than a preset threshold value or not is judged.

Optionally, the judgment step further includes:

a prompting step: when it is judged that an AU feature of which the probability is higher than the preset threshold value exists in the prediction result, such a prompt that the AU feature is recognized from the real-time facial image is made.

Specific implementation modes of the computer-readable storage medium of the disclosure are substantially the same as the specific implementation modes of the AU feature recognition method and will not be elaborated herein.

It is to be noted that terms "include" and "contain" or any other variant thereof in the disclosure are intended to cover nonexclusive inclusions, so that a process, device, object or method including a series of elements not only includes those elements but also includes other elements which are not listed clearly or further includes elements intrinsic to the process, the device, the object or the method. Under the condition of no more restrictions, an element defined by a statement "including a/an . . . " does not exclude existence of the same other element in a process, device, object or method including the element.

The foregoing numbering of the embodiments of the disclosure is intended for description only, and is not indicative of the pros and cons of these embodiments. By the description of the foregoing embodiments, it will be evident to those skilled in the art that the methods of the embodiments can be implemented by means of software plus the necessary general-purpose hardware platform; and they can of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., a read-only memory (ROM)/random access memory (RAM), a magnetic disk, an optical disc), including multiple instructions that, when executed, can cause a computing device (e.g., a mobile phone, a computer, a server, a network device), to execute the methods described in the various embodiments of the disclosure.

The above is only the preferred embodiment of the disclosure and therefore is not intended as limiting the patentable scope of the disclosure. Any equivalent configurational or flow transformations that are made taking advantage of the disclosure and that are used directly or indirectly in any other related technical field shall all fall in the scope of protection of the disclosure.

What is claimed is:

1. An electronic device, comprising: a memory, a processor and a photographic device, an action unit (AU) feature recognition program being stored in the memory and the AU feature recognition program being executed by the processor to implement the following steps of:

a real-time image capturing step: acquiring a real-time image shot by the photographic device and extracting a real-time facial image from the real-time image by use of a face recognition algorithm;

a facial feature point recognition step: inputting the real-time facial image into a pretrained facial mean shape and recognizing t facial feature points from the real-time facial image by use of the facial mean shape, wherein the training steps for the facial mean shape comprising:

establishing a first sample library with n facial images and marking t facial feature points at positions of eyes, eyebrows, noses, mouths and facial outer contours in each of the facial images; and training a facial feature recognition model by use of the t facial feature points to obtain the facial mean shape, where t represents a concatenation sequence number;

a local feature extraction step: determining feature regions matched with each AU in the real-time facial image according to positions of the t facial feature points, extracting local features from the feature regions and generating multiple feature vectors; and an AU feature prediction step: inputting the multiple feature vectors into pretrained AU classifiers matched with the feature regions respectively to obtain a prediction result of recognition of the corresponding AU features from the feature regions.

2. The electronic device of claim 1, wherein the AU feature recognition program is executed by the processor to further implement the following step:

a judgment step: judging whether probabilities of each AU feature in the prediction result are higher than a preset threshold value or not.

3. The electronic device of claim 2, wherein the judgment step further comprises:

a prompting step: when it is judged that an AU feature of which the probability is higher than the preset threshold value exists in the prediction result, making such a prompt that the AU feature is recognized from the real-time facial image.

4. The electronic device of claim 1, wherein training steps for the predetermined AU classifier comprises:
   a sample preparation step: collecting a facial sample image, cropping an image region matched with each AU from the facial sample image as a positive sample image of the AU and preparing a negative sample image for each AU;
   a local feature extraction step: extracting local features of the positive sample image and negative sample image of each AU and generating corresponding feature vectors; and
   a model training step: performing learning training on a Support Vector Machine (SVM) by use of the local feature of the positive/negative sample image of each AU to obtain the corresponding AU classifier.

5. An action unit (AU) feature recognition method, comprising:
   a real-time image capturing step: acquiring a real-time image shot by the photographic device and extracting a real-time facial image from the real-time image by use of a face recognition algorithm;
   a facial feature point recognition step: inputting the real-time facial image into a pretrained facial mean shape and recognizing t facial feature points from the real-time facial image by use of the facial mean shape, wherein the training steps for the facial mean shape comprising:
   establishing a first sample library with n facial images and marking t facial feature points at positions of eyes, eyebrows, noses, mouths and facial outer contours in each of the facial images; and training a facial feature recognition model by use of the t facial feature points to obtain the facial mean shape, where t represents a concatenation sequence number;
   a local feature extraction step: determining feature regions matched with each AU in the real-time facial image according to positions of the t facial feature points, extracting local features from the feature regions and generating multiple feature vectors; and
   an AU feature prediction step: inputting the multiple feature vectors into pretrained AU classifiers matched with the feature regions respectively to obtain a prediction result of recognition of the corresponding AU features from the feature regions.

6. The AU feature recognition method of claim 5, wherein the facial mean shape is obtained by training a facial feature recognition model, and the facial feature recognition model is an ensemble of regression trees (ERT) algorithm and is represented by a formula as follows:

$$\hat{S}^{t1+1}=\hat{S}^{t1}+\tau_{t1}(I,\hat{S}^{t1}),$$

where t1 represents a concatenation sequence number, $\tau_{t1}$ $\tau_t(\cdot,\cdot)$ represents a regressor of a present stage and $\hat{S}^{t1}$ is a shape estimate of a present model; each regressor $\tau_{t1}$ $\tau_t(\cdot,\cdot)$ predicts an increment $\tau_{t1}(I,\hat{S}^{t1})$ according to an input present image I and $\hat{S}^{t1}$ and adds the increment to the present shape estimate to improve the present model; and in a model training process, part of feature points of all sample pictures are extracted to train a first regression tree, a second tree is trained by use of residuals between predicted values of the first regression tree and true values of the part of feature points, and so on, when residuals of predicted values of an Nth trained tree and the true values of the part of feature points are close to zero, all regression trees of the ERT algorithm are obtained, and the facial mean shape is obtained according to these regression trees.

7. The AU feature recognition method of claim 6, further comprising:
   a judgment step: judging whether probabilities of each AU feature in the prediction result are higher than the preset threshold value or not.

8. The AU feature recognition method of claim 7, wherein the judgment step further comprises:
   a prompting step: when it is judged that an AU feature of which the probability is higher than the preset threshold value exists in the prediction result, making such a prompt that the AU feature is recognized from the real-time facial image.

9. The AU feature recognition method of claim 5, wherein training steps for the AU classifier comprise:
   a sample preparation step: collecting a facial sample image, cropping an image region matched with each AU from the facial sample image as a positive sample image of the AU and preparing a negative sample image for each AU;
   a local feature extraction step: extracting local features of the positive sample image and negative sample image of each AU and generating corresponding feature vectors; and
   a model training step: performing learning training on a Support Vector Machine (SVM) by use of the local feature of the positive/negative sample image of each AU to obtain the corresponding AU classifier.

* * * * *